Figure 3:
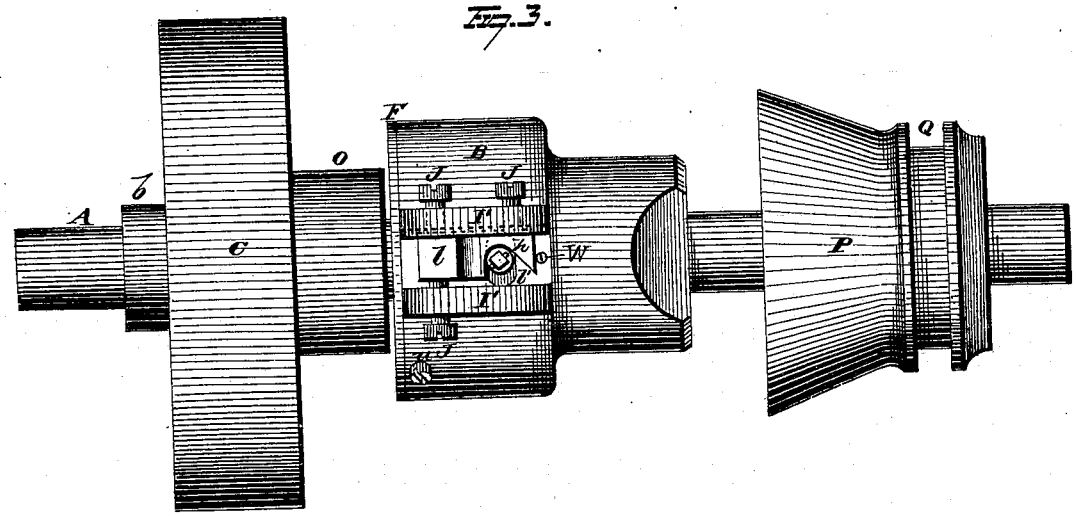

3 Sheets—Sheet 1
H. BARNES.
Friction-Clutch.
No. 202,400. Patented April 16, 1878.
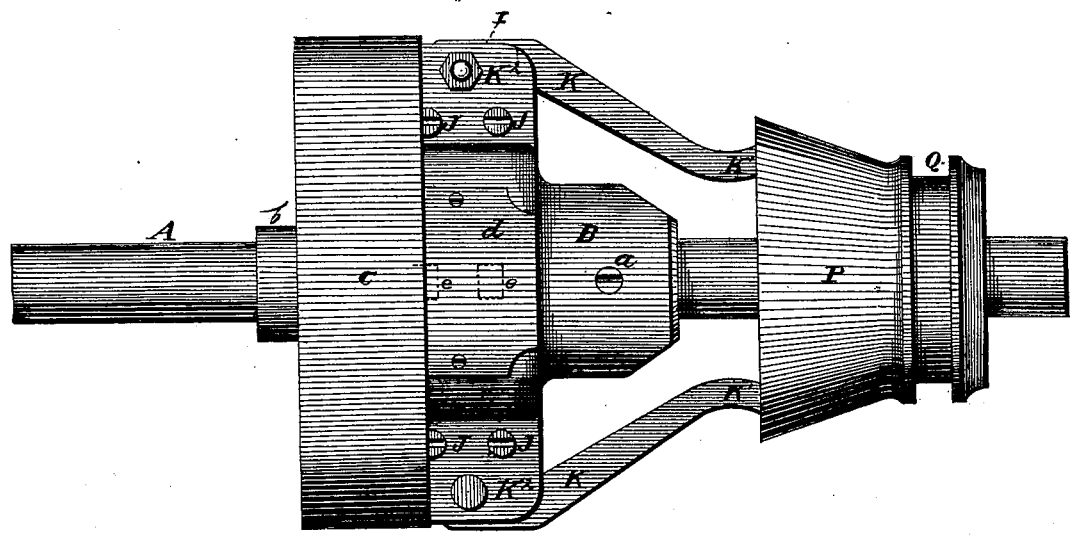
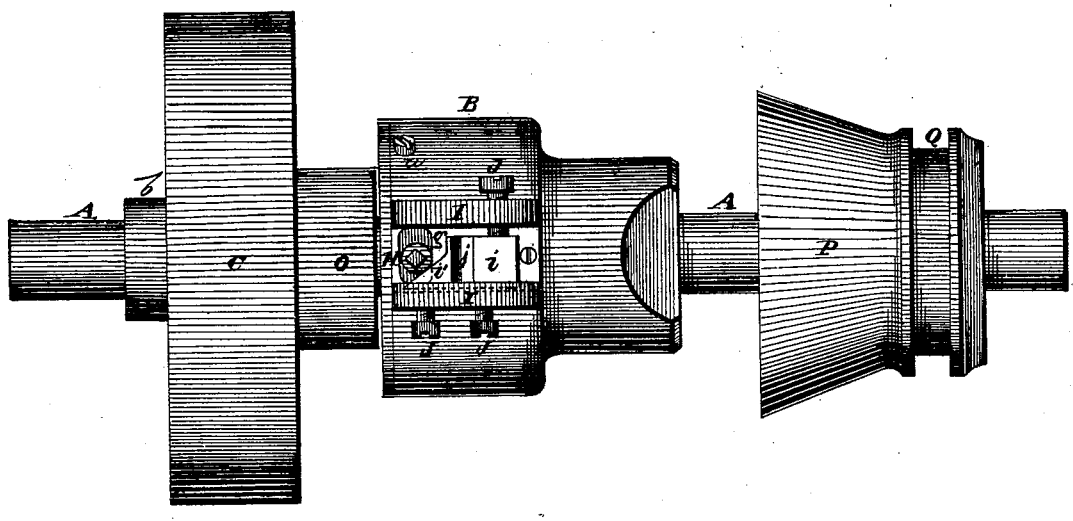
WITNESSES
INVENTOR 3 Sheets—Sheet 2

H. BARNES.
Friction-Clutch.

No. 202,400. Patented April 16, 1878.

WITNESSES
Ed. J. Nottingham
A. W. Bright

INVENTOR
Henry Barnes.
By Henry A. Seymour.
ATTORNEY

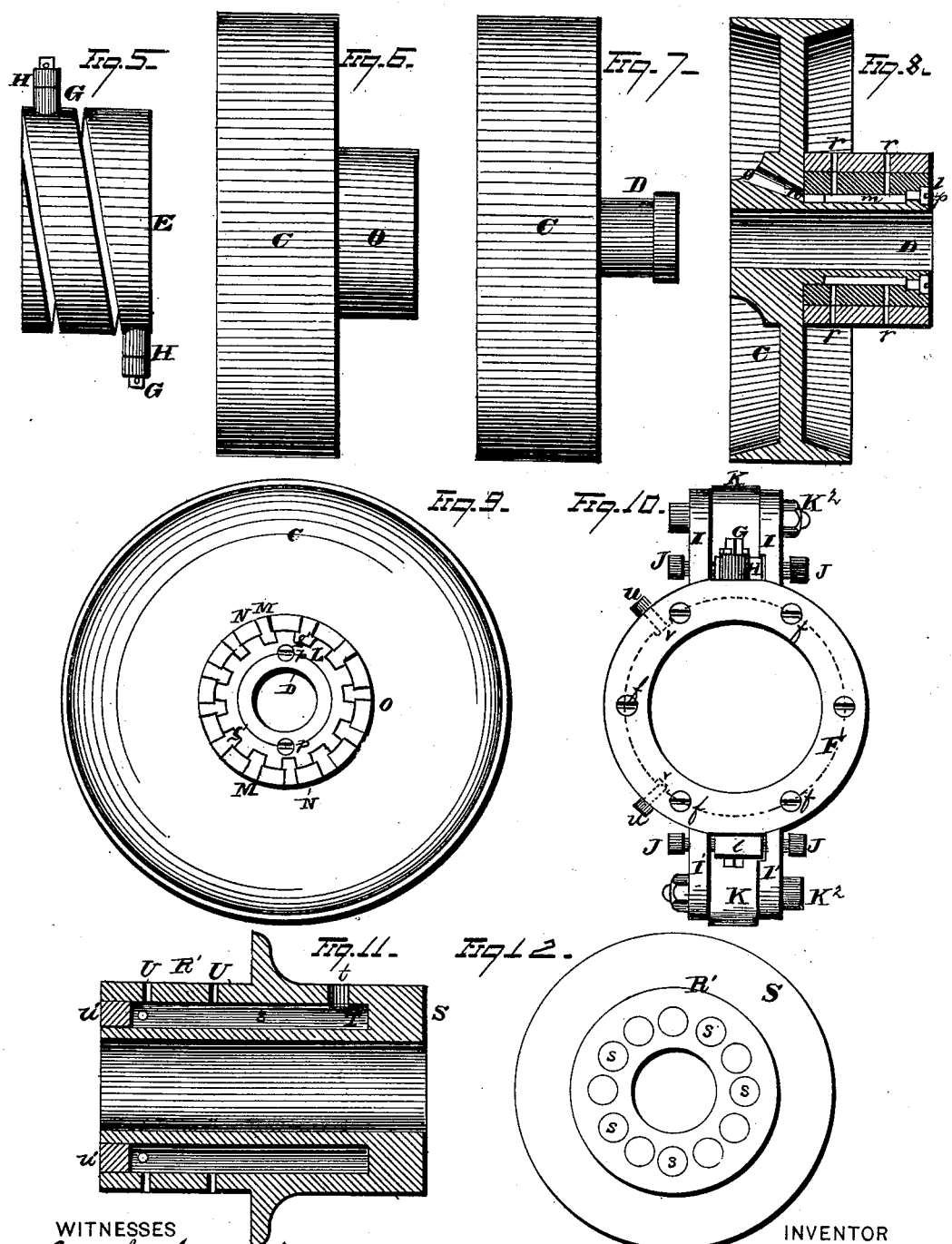

UNITED STATES PATENT OFFICE.

HENRY BARNES, OF ORANGE, MASSACHUSETTS.

IMPROVEMENT IN FRICTION-CLUTCHES.

Specification forming part of Letters Patent No. 202,400, dated April 16, 1878; application filed March 5, 1878.

*To all whom it may concern:*

Be it known that I, HENRY BARNES, of Orange, in the county of Franklin and State of Massachusetts, have invented certain new and useful Improvements in Friction-Clutches; and I do hereby declare the following to be a full, clear, and exact description of the invention, such as will enable others skilled in the art to which it pertains to make and use it, reference being had to the accompanying drawings, which form part of this specification.

My invention relates to an improvement in friction clutches or pulleys, the object being to provide a friction-clutch of such construction that friction may be evenly applied and distributed on the entire surface of the hub of a pulley, gear-wheel, or hub attached to a line-shafting; and to that end my invention consists, first, in a friction-clutch, in the combination, with a loose pulley, of a false hub attached to the shaft, said hub provided with a friction band or spring, which entirely surrounds the hub and is adapted to be expanded or contracted, as desired, whereby the entire periphery of the hub of the loose pulley is subjected to the frictional contact of the friction band or spring.

My invention further consists, in a friction clutch or pulley, in the combination, with a loose hub attached to a pulley, gear-wheel or shafting, of a false hub provided with a spiral friction band or spring, and suitable means attached to the opposite ends of said spiral band or spring for expanding or contracting the same.

My invention further consists, in a frictional clutch or pulley, in the combination, with a loose hub attached to a pulley, gear-wheel, or shafting, of a false hub provided with a spiral friction band or spring, and suitable packing interposed between the coils of the friction band or spring.

My invention further consists, in a friction clutch or pulley, in a loose hub attached to a pulley, gear-wheel, or shafting, the periphery of said hub consisting of a metallic ring covered with wood, leather, rawhide, or equivalent material.

My invention further consists, in a friction clutch or pulley, in a loose pulley provided with hub, and a detachable friction-hub secured thereto, the pulley-hub constructed with a recess for retaining lubricating material.

My invention further consists, in a friction clutch or pulley, in the combination, with a loose hub attached to a pulley, gear-wheel, or shafting, of a false hub provided with a friction ring or spring, having studs secured to one or both ends, and wedges, one or more, for contracting said springs through the medium of said studs.

My invention further consists, in a friction clutch or pulley, in the combination with, a loose hub attached to a pulley, gear-wheel, or shafting, and a false hub provided with a spiral friction ring or spring, of bell-crank levers acting through suitable wedges and studs to force the spiral friction ring or band in close contact with the loose hub.

My invention further consists, in a friction clutch or pulley, in a false hub provided with lugs which serve the double purpose of guide-ways for the friction-band wedges, and bearings for bell-crank levers by which said wedges are actuated.

My invention further consists, in a friction clutch or pulley, in the combination, with a spiral friction ring or spring, of anti-friction rollers journaled on studs secured to the opposite ends of said ring or spring, and suitable wedges engaging with said rollers for contracting the diameter of the spiral ring or spring.

My invention further consists, in a friction clutch or pulley, in the combination, with studs secured to the opposite ends of a spiral friction ring or spring, of laterally-adjustable wedges, for regulating the action of the friction spring or ring.

My invention further consists, in a friction clutch or pulley, in the combination, with the actuating-wedges, the same provided with open grooves, of bell-crank levers constructed to engage said grooves and impart the desired movement to the wedges.

My invention further consists, in a friction clutch or pulley, in the combination, with a false hub and a spiral friction ring or spring, of an annular collar or plate, removably secured to the end of said false hub, for retaining the lubricant within the false hub.

My invention further consists, in a friction clutch or pulley, in the combination, with a false hub having a spiral friction-ring located therein, of wedges engaging with studs attached to the opposite ends of said ring, bell-crank levers adapted to actuate the wedges, and a sliding collar having an outwardly-flaring recess formed in its end.

My invention further consists in the several details of construction and combinations of parts, as will be hereinafter described, and pointed out in the claims.

Figure 4:
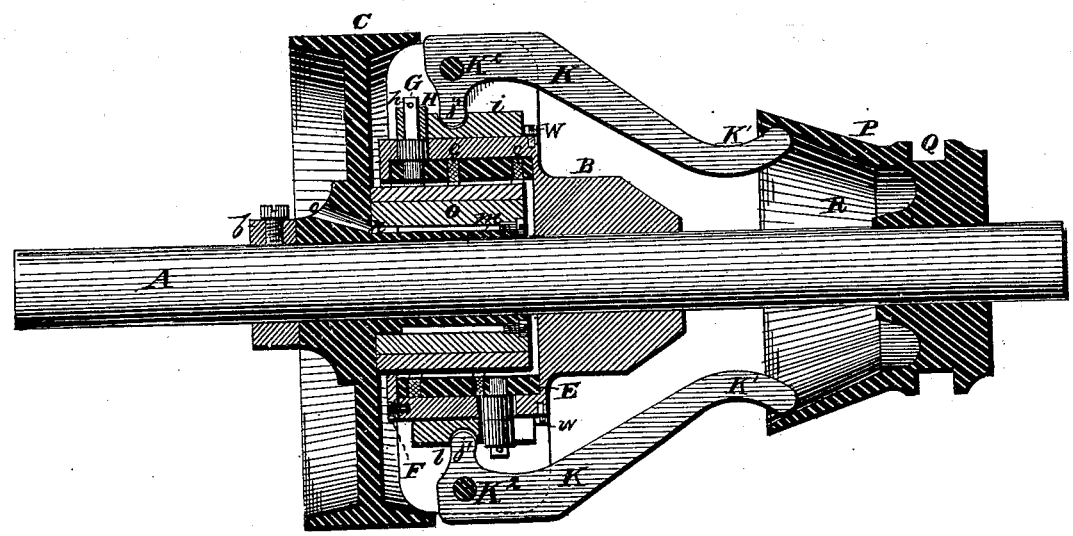

In the accompanying drawings, Figure 1 is a side elevation of my invention. Figs. 2 and 3 show opposite sides of the false hubs with the bell-crank lever detached therefrom. Fig. 4 is a vertical section of my improvement. Fig. 5 is a detached view of the spiral spring or ring. Fig. 6 is a detached view of the loose pulley. Fig. 7 represents the pulley and hub removed therefrom. Fig. 8 is a vertical section of the pulley and hub. Fig. 9 is an end view of the pulley. Fig. 10 is an end view of the false hub. Fig. 11 is a vertical section of a modification, and Fig. 12 is an end view of the same.

A represents a revolving shaft, having the false hub B firmly secured thereto by feather and spline, or by a set-screw, $a$, as desired. C is a loose pulley, provided with a hub, D, which enters the false hub B, said pulley being kept from lateral displacement by means of a collar, $b$, keyed to the shaft A. The false hub B is constructed as follows: Within the interior of the hub is placed a spiral ring or spring, E, which may be formed of any material desired, the inner surfaces of the several coils of the ring being turned out perfectly true. Sufficient space is provided between the adjacent edges of the coils of the ring to allow the same to expand or contract freely. Packing material $c$ is placed between the coils of the friction ring or spring, that lubricating material may be retained therein. A cap, $d$, which is removably secured to the surface of the false hub, serves to close openings $e$ extending through the shell of the false hub. Openings $e$ allow of the introduction of oil to the packing $c$. An annular plate or ring, F, which is held in place by screws $f$, serves to retain the lubricating material within the false hub. To the opposite ends of the spiral friction ring or spring E are secured the studs G, which latter project through the oblong slots $g$ formed in the shell of the false hub, and have journaled on their outer ends anti-friction rollers H, which are secured by pins $h$. False hub B is provided with lugs I and I', which are located diametrically opposite each other. Between the lugs I, Figs. 2 and 4, is placed a sliding wedge, $i$, which rests on a flat seat formed on the surface of the hub. The inclined portion $i'$ of said wedge rests in direct contact with the periphery of the anti-friction roller H. When the wedge is forced toward the roller it operates to move the same along the oblong slot, and, through the medium of the stud G, contract the diameter of the spiral friction ring or spring E. When the wedge is moved away from the roller the resiliency of the spring forces the roller back to the opposite end of the slot, and thus the spring is expanded again. The wedge $i$ is adapted to be laterally adjusted by means of the set-screws J, which bear against the edges thereof, whereby any desired degree of compression may be imparted to the spiral friction ring or band by operating the wedge under varying adjustments. A slot, $j$, is formed in the upper face of wedge $i$ for the reception of the rounded end $j'$ of the bell-crank lever K, which latter is pivoted between lugs I by means of a bolt, $K^2$. When the outer arm $K^1$ of said lever K is depressed, it operates to force the wedge in contact with roller H and compress the ring or spring E. The stud attached to the opposite end of the spiral friction ring or spring is operated in the manner above set forth. The only difference in construction of the several parts is that wedge $l$ has an interior inclined surface, $l'$, which engages with stud, whereby the wedge is drawn in a direction opposite to the line of movement of the wedge $i$ by means of the bell-crank lever, and thus the lower end of the spring or ring E is contracted. Set-screws $u$ (one or more) extend through the false hub, and project into grooves V in the spiral friction ring or spring, and serve to counteract the outward pressure of the wedges on the studs attached to the ends of said friction-ring. Stop-screws W are arranged in rear of the wedges to keep the same and bell-crank levers in place.

From the foregoing it will be understood that when the outer arms of the bell-crank levers are depressed the opposite ends of the spiral friction ring or spring toward each other are drawn simultaneously, thus reducing the diameter of said ring, and when compressive force is released from the ends of said levers the spiral friction-ring operates, by reason of its resiliency, to return said levers to their full expanded condition, and the ring then fills the recess within the false hub.

The loose pulley, C is provided with a tubular journal or hub, D, which is equal in length to the recess in the false hub B. Hub D has an oil-channel, $m$, formed therein, and an opening, $n$, extending to the hub $o$ on the opposite of said pulley, for the admission of lubricants. To the hub D, Fig. 9, is attached a sleeve, L, by screws $p$, or in any desired manner. The periphery of sleeve L is formed with any desired number of undercut grooves, $g'$, for the purpose of holding the strips M, which project beyond the surface of said sleeve, and serve to secure the filling-pieces N in place. Strips M and filling-pieces N may be composed of wood or any other desired material. Holes $r$ extend through the outer covering, the sleeve, and hub, and connect with the oil-reservoir, whereby lubricating material is fed to the periphery of the hub O of the loose pulley. P represents a sliding collar or hub, which is provided with a groove, Q, for the purpose of enabling the collar to be moved on the revolving shaft by means of a shifting-lever. The innner end of collar P is formed with an inner recess, R, which is outwardly flaring in form, and within which are inserted the outer ends of the bell-crank levers.

The operation of the device is as follows: The sliding collar P, being moved toward the false hub B, operates to depress the outer ends of the bell-crank levers, and the short arms of said levers impart movement to the sliding wedges attached to the false hubs. As these wedges engage with the studs attached to the ends of the spiral friction ring or spring, it follows that the opposite ends of said spring will be drawn toward each other simultaneously, and thus cause the entire surface of the hub O on the loose pulley to be brought in direct frictional contact with said friction-ring, whereby the loose pulley is forced to revolve with the false hub. As the opposite ends of the friction-ring are moved or drawn toward each other a limited movement of the bell-crank levers will suffice to lock the loose pulley to the false hub, and hence the shifting-lever need only be moved a short distance to operate the clutch. When the friction-ring is released from the hub O on the loose pulley all tendency toward undue friction arising from the effect of centrifugal action on the bell-crank levers is obviated, as the ends of said levers are held from flying outward by means of the flaring recess within the sliding collar.

Fig. 11 shows a modification. In this form of construction hub R' is represented as being combined with a shaft-collar, S, for the purpose of connecting or disconnecting line-shafting. Hub R', instead of being provided with a wooden periphery, is made of cast or wrought metal, and provided with any number of holes $s$, which connect with an oil-channel, T, to which oil is fed through opening $t$. Holes $s$ are plugged by cork or other material $u'$, that the oil may not be allowed to escape rapidly and waste. U are holes leading from the oil-openings $s$ to the periphery of hub R', to allow oil to flow to the surface of said hub and lubricate the several parts of the clutch.

From the foregoing it is evident that many slight changes in the construction, arrangement of parts, and material employed may be resorted to without departing from the spirit of my invention, and hence I would have it understood that I do not limit myself to the exact construction shown and described.

Having fully described my invention, what I claim as new, and desire to secure by Letters Patent, is—

1. In a friction clutch or pulley, the combination, with a hub attached to a loose pulley, gear-wheel, or shafting, of a false hub provided with a friction-ring and means, substantially as set forth, for drawing the opposite ends of said ring toward each other simultaneously, substantially as set forth.

2. In a friction clutch or pulley, the combination, with a hub attached to a loose pulley, gear-wheel, or shafting, of a false hub, provided with a spiral friction ring or spring, and suitable means connected to the opposite ends of said ring or spring, for drawing them toward each other simultaneously and forcing said spring in frictional contact with the hub, substantially as set forth.

3. In a friction clutch or pulley, the combination, with a hub attached to a loose pulley, gear-wheel, or shafting, of a false hub, provided with a spiral friction ring or spring, and suitable packing interposed between the coils of the spiral friction-ring, substantially as set forth.

4. In a friction clutch or pulley, a hub attached to a loose pulley, gear-wheel, or shafting, the periphery of said hub consisting of wood, leather, rawhide, or equivalent material, substantially as set forth.

5. In a friction clutch or pulley, a hub attached to a loose pulley, gear-wheel, or shafting, said hub consisting of a tubular journal provided with a detachable friction-hub, said parts provided with an inclosed oil-chamber, substantially as set forth.

6. In a friction clutch or pulley, the combination, with a loose pulley provided with a friction-hub, of a false hub provided with a spiral friction ring or spring, the latter having studs attached to its opposite ends and wedges adapted to draw said studs toward each other, substantially as set forth.

7. In a friction clutch or pulley, the combination, with a spiral friction ring or spring, of anti-friction rollers, journaled on studs attached to the opposite ends of said spring or ring, and wedges adapted to impart the requisite movement to said studs, substantially as set forth.

8. In a friction clutch or pulley, the combination, with a hub attached to a loose pulley, gear-wheel, or shafting, and a false hub provided with a spiral friction spring or ring, of bell-crank and suitable wedges and studs for drawing said spiral spring or ring in close frictional contact with said hub, substantially as set forth.

9. In a friction clutch or pulley, the combination, with a false hub provided with lugs on opposite sides thereof, of wedges placed between said lugs and bell-crank levers pivoted to the false hub, substantially as set forth.

10. In a friction clutch or pulley, the combination, with studs attached to the opposite ends of a spiral friction ring or spring, of laterally-adjustable wedges, substantially as set forth.

11. In a friction clutch or pulley, the combination, with wedges provided with open grooves, of bell-crank levers, constructed to engage said grooves and actuate said wedges, substantially as set forth.

12. In a friction clutch or pulley, the combination, with a false hub provided with a spiral friction ring or spring, of an annular plate or collar secured to the end of the false hub, for retaining the lubricating material in the false hub, substantially as set forth.

13. In a friction clutch or pulley, the combination, with a ring or spring for binding the hub of the loose pulley, gear-wheel, or shafting, of bell-crank levers and wedges, the several parts arranged substantially as hereinbefore set forth, whereby the spring is contracted by forcing the outer ends of the bell-crank levers toward the shafting, substantially as set forth.

14. The combination, with a false hub and a spiral friction-ring located therein, of wedges engaging with studs attached to the opposite ends of said ring, bell-crank levers adapted to actuate said wedges, and a sliding collar having an outwardly-flaring recess formed therein, substantially as set forth.

15. In a friction clutch or pulley, the combination, with a loose pulley, of a sleeve having under-cut grooves formed in its periphery, and wooden strips secured therein, substantially as set forth.

16. In a friction clutch or pulley, the combination of a removable hub with the loose pulley, substantially as set forth.

17. The combination, with the spiral friction ring or spring and the false hub, of set-screws (one or more) projecting into grooves formed in the friction ring or spring, substantially as set forth.

18. The combination, with the spiral friction ring or spring and operating-wedges, of stop-screws arranged to prevent the displacement of the wedges and bell-crank lever, substantially as set forth.

In testimony that I claim the foregoing I have hereunto set my hand.

HENRY BARNES.

Witnesses:
JOHN BARNES,
W. C. BALLOU.